Patented Feb. 7, 1939

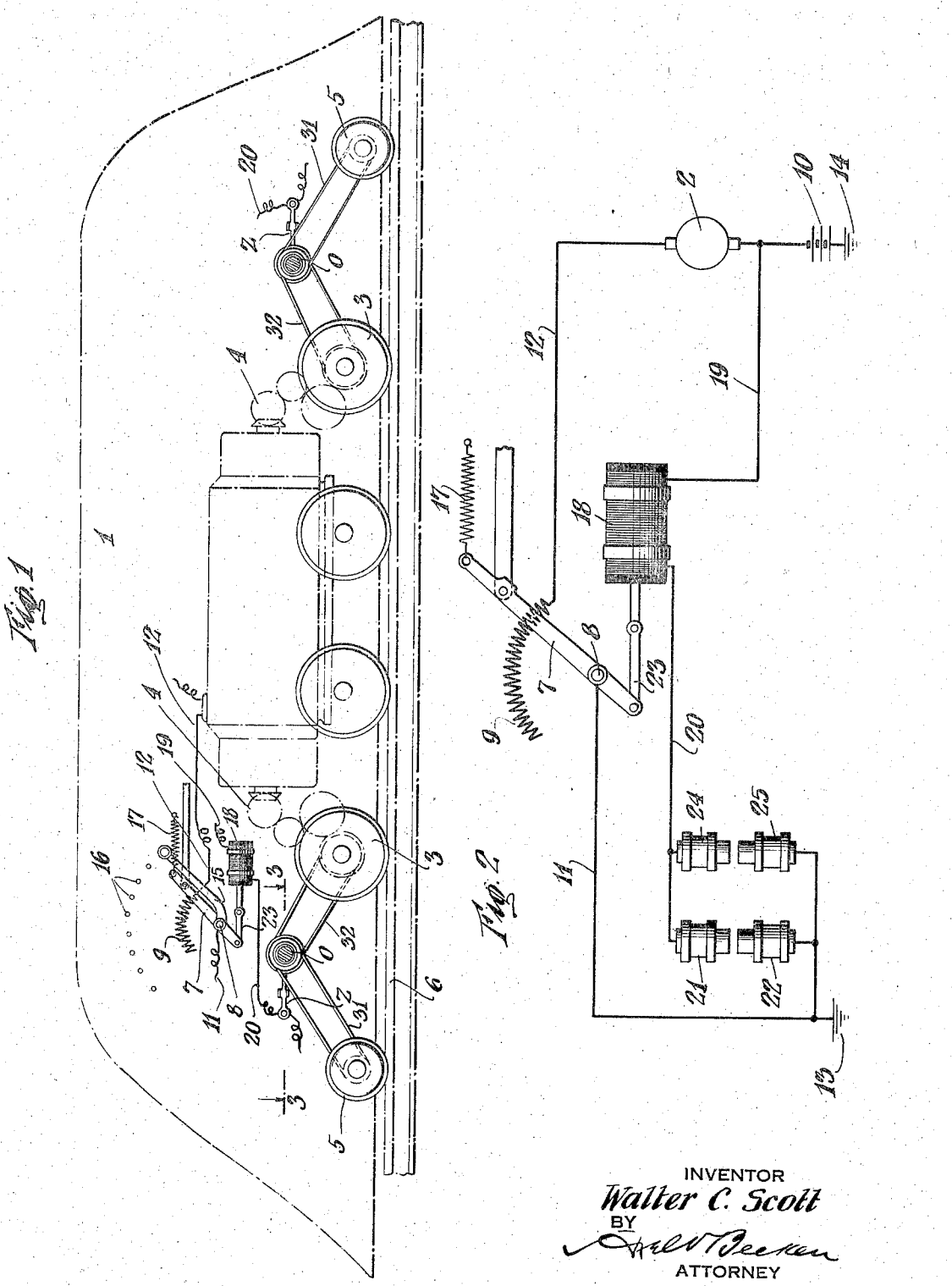

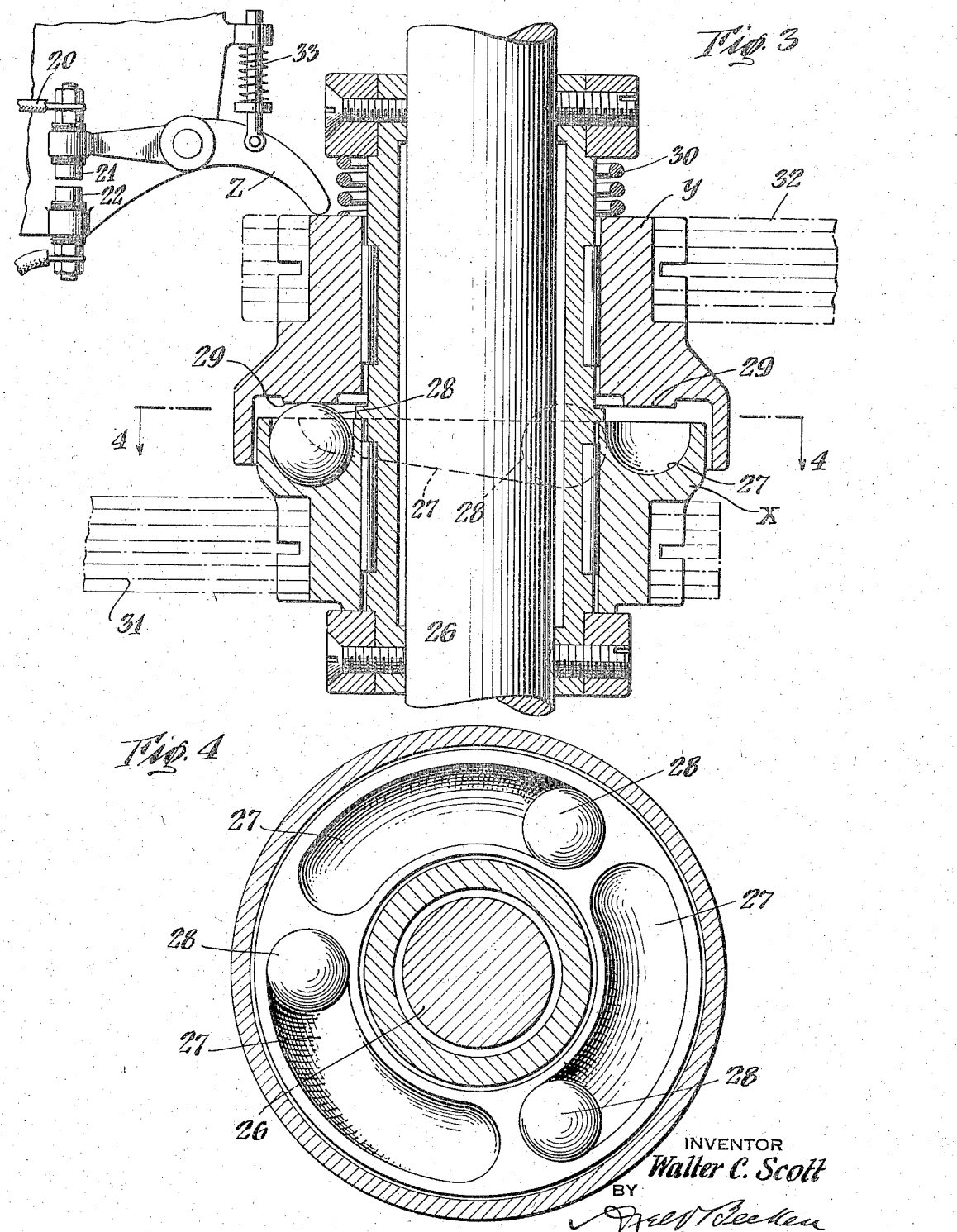

2,146,383

UNITED STATES PATENT OFFICE 2,146,383

SPEED CONTROL MECHANISM

Walter C. Scott, Plainfield, N. J.

Application June 11, 1936, Serial No. 84,680

9 Claims. (Cl. 105—48)

The present invention relates to speed control means, and has for its main object and feature the provision of means to overcome undesirable rotative slippage of the driver wheels of a locomotive.

In the accompanying drawings the invention is disclosed in one form, in which

Fig. 1 is a more or less diagrammatic view of a locomotive embodying the invention;

Fig. 2 is a diagrammatic view of a circuit means that can be employed in connection with the invention;

Fig. 3 is an enlarged sectional view substantially on the plane of line 3—3 of Fig. 1; and Fig. 4 is a detail sectional view substantially on the plane of line 4—4 of Fig. 3.

In starting up a locomotive from a state of rest it frequently occurs that rotative slippage of the driver wheels with respect to the running rails takes place and that in consequence the driver wheels spin instead of exerting a tractive effect to move the locomotive. This invention contemplates the employment of a speed control mechanism that is responsive to the speed of both the driver wheels and the rider wheels and which in turn, when an abnormal difference in speed occurs between said driver and rider wheels, acts to control the driving means of the driver wheels to thereby stop rotative slippage of the driver wheels.

I indicates a locomotive which may be propelled by steam, gas or electricity, but which for the sake of illustration is here assumed to be operated by an electric motor 2 that constitutes the driving means for driver wheels 3 and is connected with the latter by suitable transmission means 4. 5 indicates the rider wheels that are not driven directly by driving means 3 but by frictional contact with running rails 6. 7 indicates an operating member for the driving means, and said member, here in the form of a lever pivoted at 8, may be the throttle lever of a steam engine, a throttle control lever for a gas engine or, as in this instance, the movable element of a rheostat the other member of which is indicated at 9. Members 7 and 9 are included in a circuit with motor 2 and source of current 10 by means of wires 11 and 12 and ground connections 13 and 14. In the present form of the invention there is associated with operating member 7 a positioning member 15 in the form of a lever pivoted at 8, against which positioning member the upper end of the operating member rests. This positioning member can be adjusted to any one of a plurality of predetermined positions as indicated by buttons 16, a spring 17 causing lever 7 to follow the movement of lever 15. 18 indicates an electro-magnetic device, here in the form of a slow-release solenoid, connected by wire 19 to current source 10 and by wire 20 to a pair of contacts 21 and 22 and thence to ground 13. The core of the solenoid is pivotally connected to lever 7 by means of connection 23. O indicates a speed control mechanism that is responsive to the speed of driver wheels 3 and rider wheels 5. The arrangement is such that, when both driver and rider wheels rotate freely at such normal relative speeds as would naturally occur, taking into consideration their difference in diameter if any, when no rotative slippage of the driver wheels takes place, contacts 21 and 22 will not engage and solenoid 18 will not be energized. Operating lever 7 will therefore remain in the position in which it has been placed by positioning lever 15. But when the driver wheels 3 slip and an abnormal speed relationship therefore exists between the driver and rider wheels, speed control mechanism O will close contacts 21 and 22 thereby completing a circuit through solenoid 18 and energizing the latter. The effect of this is to move operating lever 7 away from 15 and to cut in more resistance to motor 2 thereby slowing said motor down and consequently diminishing rotation of the driver wheels. As soon as the proper speed relation is reestablished between the driver and rider wheels, speed control mechanism O opens contacts 21 and 22 thereby deenergizing solenoid 18, whereupon spring 17 automatically restores operating lever 7 to its predetermined position. In case there is more than one set of driver and rider wheels there can be a separate speed control mechanism O associated with each set and contacts 24 and 25 of the second speed control mechanism can be arranged in parallel with contacts 21 and 22 so that if the driver wheels of either set slips a circuit will be established through solenoid 18.

Speed control mechanism O may take many forms but, preferably, there is utilized the construction shown in my application Ser. No. 60,423 filed January 23, 1936. As indicated in Figs. 3 and 4 X and Y indicate two independently rotatable speed control members carried on a shaft 26. Member X is provided with a series of arcuate, tapering grooves 27 for the reception of balls 28, and member Y is provided with a smooth engaging surface 29 that contacts with balls 28. Member Y is capable of a sliding movement on shaft 26 and is urged toward X by means of spring 30. The rotation of members X and Y is in the same direction and is here such that the shallow ends of arcuate grooves 27 lead and the deep ends trail. Member X is driven from rider wheels 5 by suitable transmission means as 31, and member Y is driven from driver wheels 3 by suitable transmission means as 32. It will now be understood that so long as the speed of member Y does not exceed that of member X, balls 28 will remain in the deep parts of grooves 27 but that, so soon as the speed of member Y exceeds that of X, balls 28 will travel into the shallow parts of grooves 27 and will thereby cause said member Y to move endwise on shaft 26 against tension of spring 30 and will actuate control element Z against the tension of its spring 33 to close contacts 21 and 22 (or 24 and 25). Thus when the driver wheels spin, the circuit through solenoid 18 will be established and motor 2 and consequently the driver wheels and member Y will be slowed down. When member Y has slowed down to a speed below that of X, balls 28 will travel back to the deep ends of grooves 27 and spring 30 will move Y toward X thereby opening contacts 21 and 22 and thus rupturing the circuit through 18.

The gear ratio used in driving members X and Y from 5 and 3 is simply a matter of calculation. Preferably, when the speed relationship between 3 and 5 is normal, control members X and Y will run at equal speeds, although it might be preferred to have member Y run somewhat slower than X so as to permit a slight amount of slippage of 3 without energizing solenoid 18.

I claim:

1. The combination with the driver and rider wheels of a locomotive, of driving means for the driver wheels, a positioning lever, an operating lever for the driving means associated with the positioning lever and adapted to follow the movement thereof, and means including a speed control mechanism to move the operating lever independently of the positioning lever in response to an abnormal difference in the relative speed of the driver and rider wheels.

2. The combination with the driver and rider wheels of a locomotive, of driving means for the driver wheels, a positioning lever, an operating lever for the driving means associated with the positioning lever, a spring to urge the operating lever toward the positioning lever, and means including a speed control mechanism to move the operating lever away from the positioning lever in response to an abnormal difference in the relative speed of the driver and rider wheels.

3. The combination with the driver and rider wheels of a locomotive, of driving means for the driver wheels, a positioning lever, an operating lever for the driving means associated with the positioning lever and positioned thereby, a spring to urge the operating lever toward the positioning lever to cause it to follow the movement of the latter, an electro-magnetic device which when energized moves the operating lever away from the positioning lever, and a speed control mechanism operated from the driver and rider wheels, and circuit means controlled by the speed control mechanism to energize the electro-magnetic device in response to an abnormal difference in the relative speed between the driver and rider wheels.

4. The combination with the driver and rider wheels of a locomotive, of driving means for the driver wheels, an operating member for the driving means, an electro-magnetic device which when energized changes the position of the operating member, and a speed control mechanism operated from the driver and rider wheels, and circuit means controlled by the speed control mechanism to energize the electromagnetic device in response to an abnormal difference in the relative speed between the driver and rider wheels.

5. The combination with the driver and rider wheels of a locomotive, of driving means for the driver wheels, two control members rotating at all times independently of each other in the same direction and capable of assuming different relative positions with respect to each other, means to drive one of said control members proportional to the speed of the rider wheels, means to drive the other of said control members proportional to the speed of the driver wheels, means to cause said control members to assume one relative position when one is driven faster than the other and to assume a different relative position when the other is driven faster than said first one, and instrumentalities responsive to the control members to control the driving means for the driver wheels when the control members assume said different relative position.

6. The combination with the driver and rider wheels of a locomotive, of driving means for the driver wheels, two axially alined control members rotating at all times independently of each other in the same direction and at least one of which is capable of axial movement toward and away from the other, means to drive one of said control members proportional to the speed of the rider wheels, means to drive the other of said control members proportional to the speed of the driver wheels, means to cause said control members to assume one relative position axially when one is driven faster than the other and to assume a different relative position axially when the other is driven faster than said first one, and instrumentalities responsive to the control members to control the driving means for the driver wheels when the control members assume said different relative position axially.

7. The combination with the driver and rider wheels of a locomotive, of driving means for the driver wheels, two axially alined control members rotating at all times independently of each other in the same direction and at least one of which is capable of axial movement toward and away from the other, one of said control members having a continuous surface adjacent the other member and said other member having arcuate taper grooves in the surface that faces said continuous surface, balls in said taper grooves, means to urge said control members toward each other, means to drive one of said control members proportional to the speed of the rider wheels, means to drive the other of said control members proportional to the speed of the driver wheels, and instrumentalities responsive to the control members to control the driving means for the driver wheels when the control members assume an axial position away from each other.

8. The combination with the driver and rider wheels of a locomotive, of driving means for the locomotive, an operating member for the driving means, a positioning member to cause, at the will of the operator, said operating member to occupy one of a number of variably predetermined positions, a speed control mechanism to vary the position of the operating member independently of the positioning member from the predetermined one in response to an abnormal difference in the relative speed of the driver and rider wheels, and means to restore said operating member to its predetermined position in response to a return to normal relative speed of the rider and driver wheels.

9. The combination with the driver and rider wheels of a locomotive, of driving means for the locomotive, a pivotally supported operating lever for the driving means, a pivotally supported positioning lever to cause, at the will of the operator, said operating lever to occupy one of a number of variably predetermined positions, a speed control mechanism to vary the position of the operating lever independently of the positioning lever from the predetermined one in response to an abnormal difference in the relative speed of the driver and rider wheels, and means to restore said operating lever to its predetermined position in response to a return to normal relative speed of the rider and driver wheels.

WALTER C. SCOTT.